US009114811B2

(12) United States Patent
Conte et al.

(10) Patent No.: US 9,114,811 B2
(45) Date of Patent: Aug. 25, 2015

(54) CABLE TRANSPORTATION SYSTEM SWITCH

(71) Applicant: ROLIC INTERNATIONAL S.AR.L, Luxembourg (LU)

(72) Inventors: Giuseppe Conte, Bolzano (IT); Franco Coco, Laives (IT)

(73) Assignee: ROPFIN B.V., Leimuiden (NL)

(*) Notice: Subject to any disclaimer, the term of this patent is extended or adjusted under 35 U.S.C. 154(b) by 0 days.

(21) Appl. No.: 14/193,863

(22) Filed: Feb. 28, 2014

(65) Prior Publication Data
US 2014/0238163 A1   Aug. 28, 2014

(30) Foreign Application Priority Data

Feb. 28, 2013 (IT) .................... MI13A0308

(51) Int. Cl.
B61B 12/00 (2006.01)
F16H 21/18 (2006.01)
B61B 9/00 (2006.01)
E01B 25/15 (2006.01)

(52) U.S. Cl.
CPC . B61B 12/00 (2013.01); B61B 9/00 (2013.01); E01B 25/15 (2013.01); F16H 21/18 (2013.01); Y10T 74/18248 (2015.01)

(58) Field of Classification Search
CPC .......... B61B 12/00; B61B 9/00; B61B 25/12; B61B 25/26; B61B 7/04; B61B 23/06; F16H 21/18; Y10T 74/18248
See application file for complete search history.

(56) References Cited

U.S. PATENT DOCUMENTS

| 2,997,004 | A | * | 8/1961 | Roseubaum et al. ..... 104/130.11 |
| 4,016,818 | A | * | 4/1977 | Ellzey ........................... 104/103 |
| 4,109,584 | A | * | 8/1978 | Mihirogi ................. 104/130.06 |
| 4,476,787 | A | * | 10/1984 | Edwards ......................... 104/96 |
| 4,484,526 | A | * | 11/1984 | Uozumi .................. 104/130.04 |
| 4,993,326 | A | * | 2/1991 | Bergemann ..................... 104/89 |
| 5,087,001 | A | * | 2/1992 | Bolli et al. ................... 246/327 |
| 5,159,880 | A | * | 11/1992 | Mugnier ......................... 104/87 |
| 5,193,767 | A | * | 3/1993 | Mihirogi ...................... 246/418 |
| 5,247,890 | A | * | 9/1993 | Mihirogi ................. 104/130.11 |
| 5,582,109 | A | * | 12/1996 | Levi et al. .................. 104/173.1 |
| 6,324,991 | B1 | * | 12/2001 | Friedrich et al. ......... 104/130.01 |

(Continued)

FOREIGN PATENT DOCUMENTS

| AT | 404010 | 7/1998 |
| AT | 405269 | 6/1999 |

(Continued)

OTHER PUBLICATIONS

International Search Report and Written Opinion for International Application No. ITMI20130308 dated Nov. 1, 2013.

Primary Examiner — Jason C Smith
(74) Attorney, Agent, or Firm — Neal, Gerber & Eisenberg LLP

(57) ABSTRACT

A switch for a cable transportation system has a movable guide with one degree of freedom, along an operating plane, between two designated or given positions; and an actuating assembly having a rotary actuator, and a crank which is rotated by the rotary actuator between two limit stops about an axis of rotation perpendicular to the operating plane, and is connected to the movable guide in such a manner as to define a mechanism having two stable positions corresponding to the designated or given positions of the movable guide when the crank is in the limit stop positions.

30 Claims, 7 Drawing Sheets

(56) References Cited

U.S. PATENT DOCUMENTS

| | | | |
|---|---|---|---|
| 6,332,406 B1 * | 12/2001 | Mugnier | 104/130.11 |
| 8,051,777 B2 * | 11/2011 | Weissbrodt | 104/102 |
| 8,302,536 B1 * | 11/2012 | Meinzinger | 104/102 |
| 8,398,031 B2 * | 3/2013 | Gawelczyk et al. | 246/415 R |
| 8,573,132 B2 | 11/2013 | Conte et al. | |
| 2007/0034105 A1 * | 2/2007 | Mugnier | 104/178 |
| 2012/0090496 A1 * | 4/2012 | Conte et al. | 104/130.01 |
| 2012/0090497 A1 * | 4/2012 | Fischer et al. | 104/130.06 |
| 2014/0238163 A1 * | 8/2014 | Conte et al. | 74/49 |

FOREIGN PATENT DOCUMENTS

| | | |
|---|---|---|
| CH | 658024 | 10/1986 |
| CH | 671929 | 10/1989 |
| EP | 0687607 | 12/1995 |
| EP | 1077167 | 2/2001 |
| EP | 1088729 | 4/2001 |
| EP | 1088731 | 4/2001 |
| EP | 2407366 | 1/2012 |
| EP | 2441636 | 4/2012 |
| WO | WO 86/06118 | 10/1986 |
| WO | WO 2008/129019 | 10/2008 |
| WO | WO 2009/019259 | 2/2009 |
| WO | WO 2009/053485 | 4/2009 |

* cited by examiner

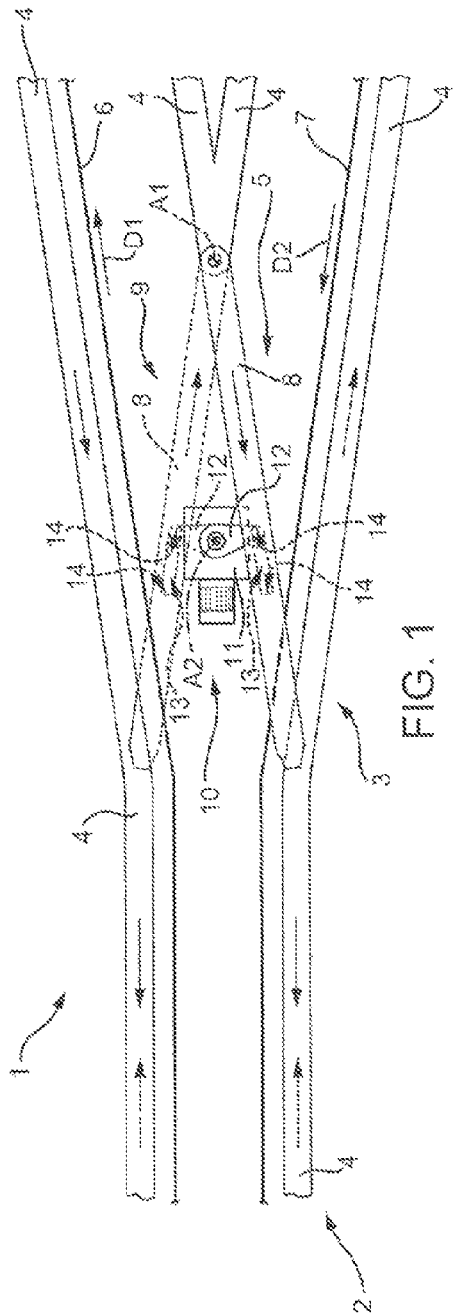
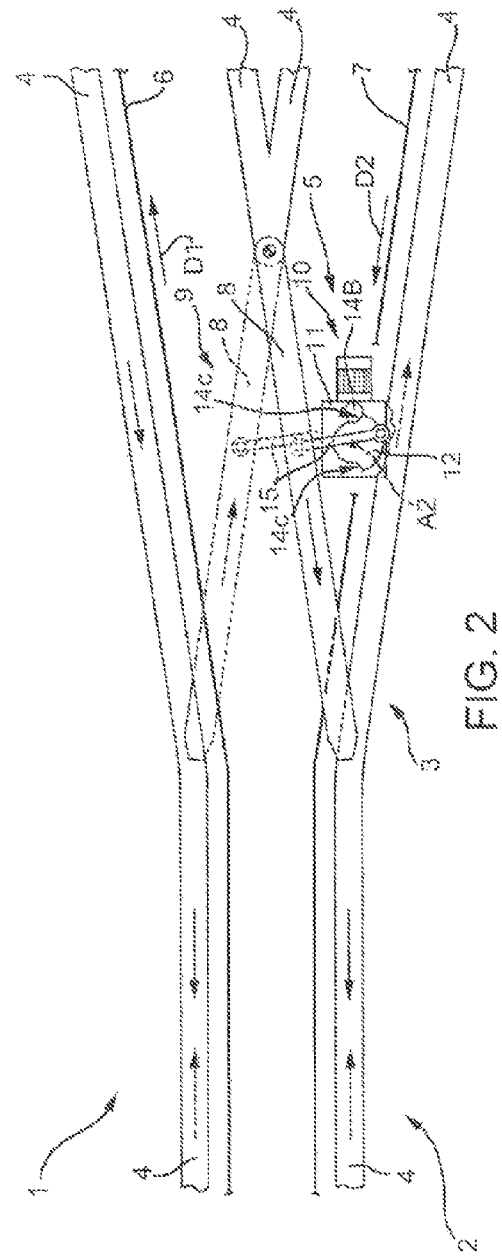

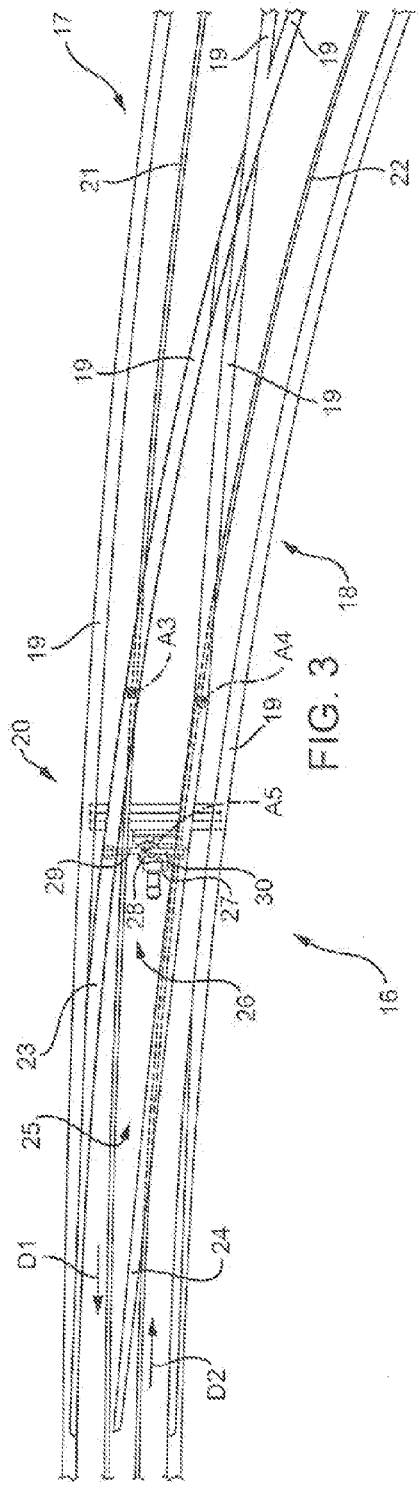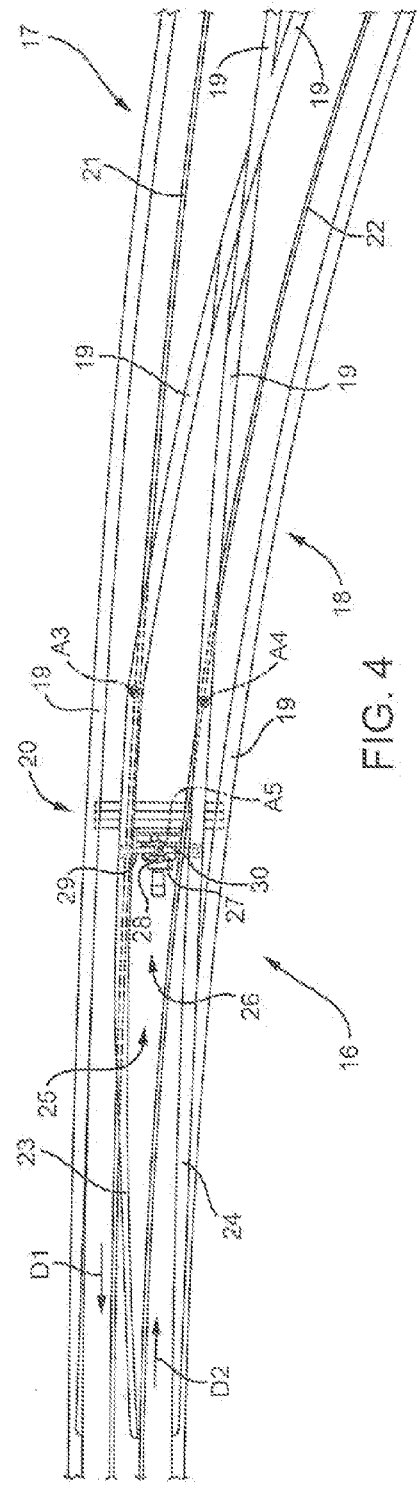

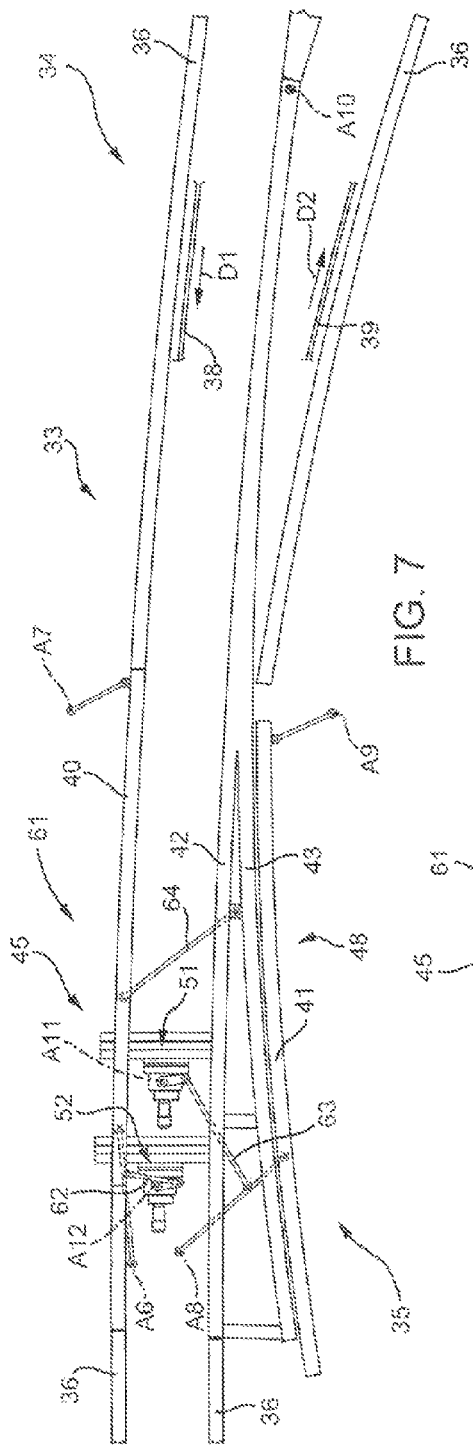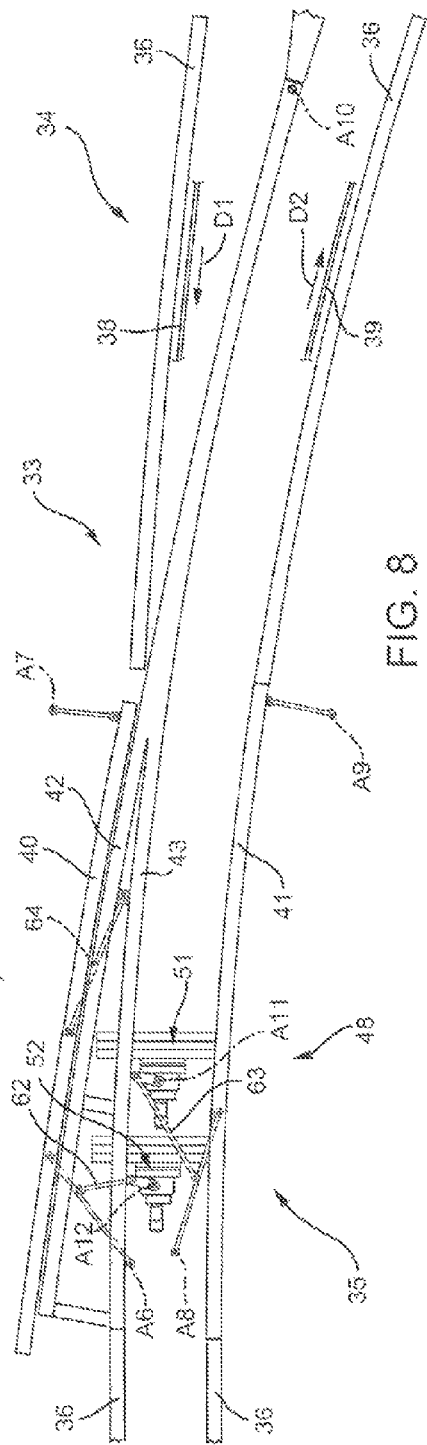

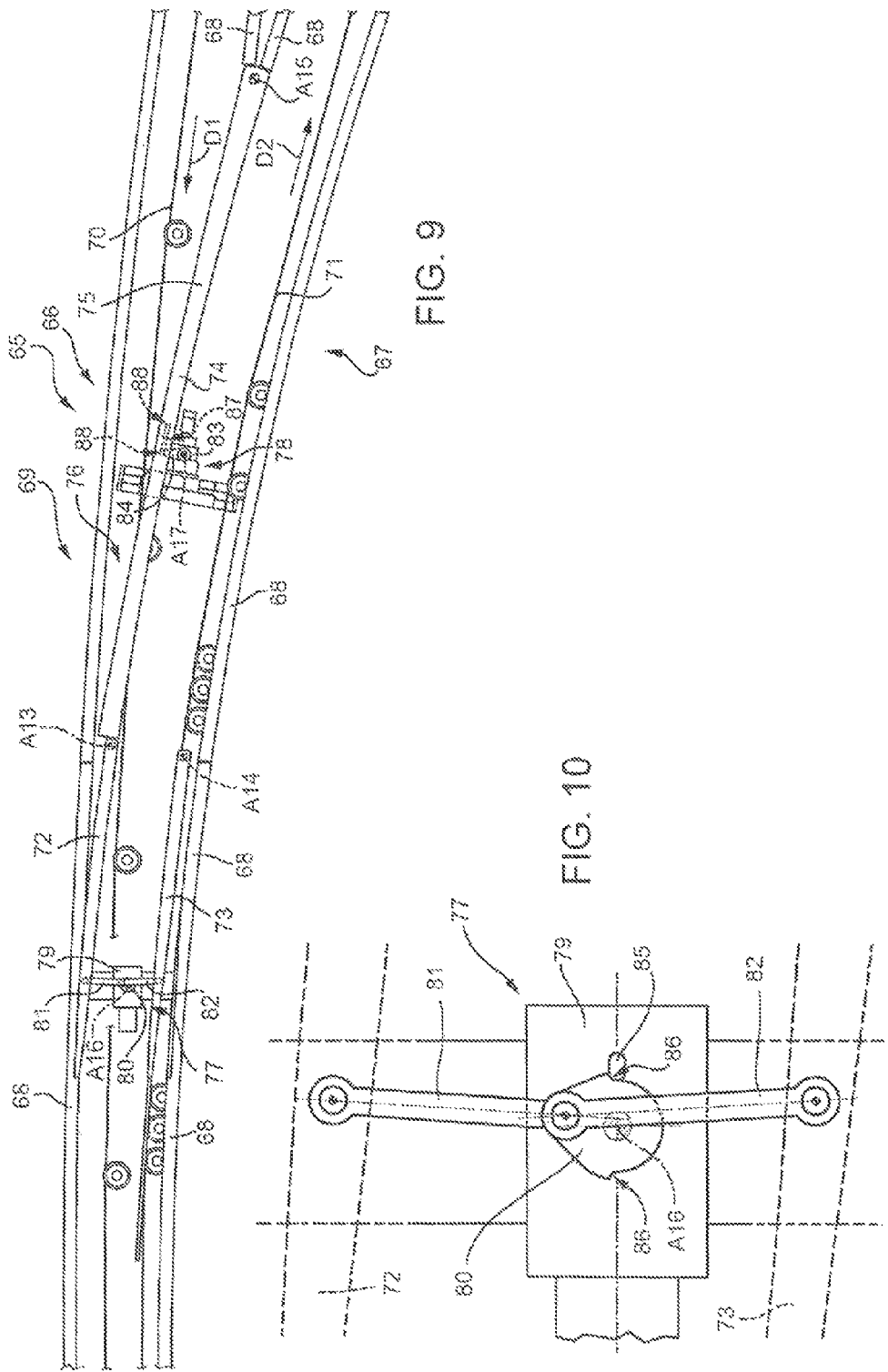

CABLE TRANSPORTATION SYSTEM SWITCH

PRIORITY CLAIM

This application claims the benefit of and priority to Italian Patent Application No. MI2013A 000308, filed on Feb. 28, 2013, the entire contents of which is incorporated by reference herein.

BACKGROUND

Certain cable transportation systems which move vehicles along a given track are described in documents: Swiss Patent Document CH 671,929; Austrian Patent Document AT 404,010; U.S. Pat. No. 5,582,109; European Patent Document EP 687,607; Austrian Patent Document AT 405,269; European Patent Document EP 1,077,167; European Patent Document EP 1,088,729; Italian Patent Document IT 1,313,914; Italian Patent Document IT 1,317,169; Italian Patent Document IT 1,316,131; Italian Patent Document IT 1,326,531; PCT Patent Application Document WO 08/129,019; PCT Patent Application Document WO 2009/019,259; and PCT Patent Application Document WO 2009/053,485.

The tracks of certain of these cable transportation systems sometimes have at least one junction. One particular type of junction is where the track splits into two at a stop station for vehicles travelling in opposite directions.

Cable transportation system tracks may comprise two-way and one-way sections, along which the transportation units pass one another in opposite directions.

Certain known cable transportation systems comprise two haul cables, which are operated in opposite directions, extend parallel to the track, between two opposite guides, and are connected to the transportation units by clamps integral with the units.

Thus, in addition to ensuring continuity of the track, the switches must also avoid interfering with the haul cables and clamps.

One example of a known switch for cable transportation systems is described in Italian Patent Document IT 1,326,531, and comprises a track section defined by two curved, parallel rails extending along respective arcs of a circle and mounted on a pivot. The curved rails are designed to connect different branches of the track, depending on the angular position of the pivot. Though effective, this type of switch has the drawback of having a very large, extremely heavy moving part, such that switching tracks involves a good deal of travel and, therefore, time.

Other types of known cable transportation system switches are described in European Patent Applications EP 2,407,366 and EP 2,441,636, in which at least one movable guide, with one degree of freedom along an operating plane, is moved between two given positions by an actuating system comprising a linear actuator. Though highly efficient, these switches need a locking device to lock, and prevent unwanted movement of the movable guides in their given positions.

SUMMARY

The present disclosure relates to a cable transportation system switch configured to move vehicles along a designated or given track.

It is an advantage of the present disclosure to provide a cable transportation system switch configured to eliminate certain of the drawbacks of certain of the known art.

According to the present disclosure, there is provided a cable transportation system switch, the switch comprising at least one movable guide having one degree of freedom, along an operating plane, between two designated or given positions; and at least an actuating assembly comprising at least a rotary actuator, and a crank, which is rotated by the rotary actuator between two limit stops about an axis of rotation perpendicular to the operating plane, and is connected to the movable guide in such a manner as to define a mechanism having two stable positions corresponding to the designated or given positions of the movable guide when the crank is in the limit stop positions.

This way, the movable guide need not be locked in its two designated or given positions.

In one embodiment, the stable positions of the mechanism correspond to two respective positions of the crank beyond the top dead centre position and bottom dead centre position of a mechanism comprising the crank and the movable guide.

The stable position of the mechanism comprising the movable guide is achieved purely geometrically. And the stability of the mechanism is assured by any force (other than that exerted by the crank) acting on the movable guide being unable to move the mechanism.

In one embodiment of the present disclosure, the crank is connected to the movable guide by a pin housed slideably inside a slot in the movable guide; the limit stops being defined by an end of the slot.

The mechanism is thus extremely simple.

In another embodiment of the present disclosure, the actuating assembly comprises a connecting rod hinged to the crank and to the movable guide; the limit stops being defined by a fixed catch, and by two seats formed on the crank and alternatively engaging the fixed catch.

Connecting rods enable a crank to be connected to a quantity or number of movable guides, which can thus be operated by one actuating assembly.

In another embodiment of the present disclosure, the switch comprises two movable guides, each movable between two designated or given positions along the operating plane. In one such embodiment, the crank is connected to both the movable guides.

In one embodiment of the present disclosure, the switch comprises two further movable guides connected rigidly to each other and which rotate, about an axis of rotation and along the operating plane, between two designated or given positions; and a further actuating assembly.

Generally speaking, different types of one or more movable guides may advantageously be operated by one or more actuating assemblies.

Additional features and advantages are described in, and will be apparent from the following Detailed Description and the figures.

BRIEF DESCRIPTION OF THE DRAWINGS

A number of non-limiting embodiments of the present disclosure will be described by way of example with reference to the attached drawings, in which:

FIG. 1 shows a schematic plan view, with parts removed for clarity, of a cable transportation system comprising a switch in accordance with a first embodiment of the present disclosure;

FIG. 2 shows a larger-scale, schematic plan view, with parts removed for clarity, of a variation of the FIG. 1 system;

FIGS. 3 and 4 show schematic plan views of a cable transportation system comprising a switch in accordance with a second embodiment of the present disclosure;

FIGS. 7 and 8 show schematic plan views, with parts removed for clarity, of a cable transportation system comprising a switch in accordance with a variation of the third embodiment;

FIGS. 9 and 11 show schematic plan views, with parts removed for clarity, of a cable transportation system in accordance with a fourth embodiment of the present disclosure; and FIGS. 10 and 12 show larger-scale plan views, with parts removed for clarity, of two details in FIGS. 9 and 11, respectively.

DETAILED DESCRIPTION

Figure 5:
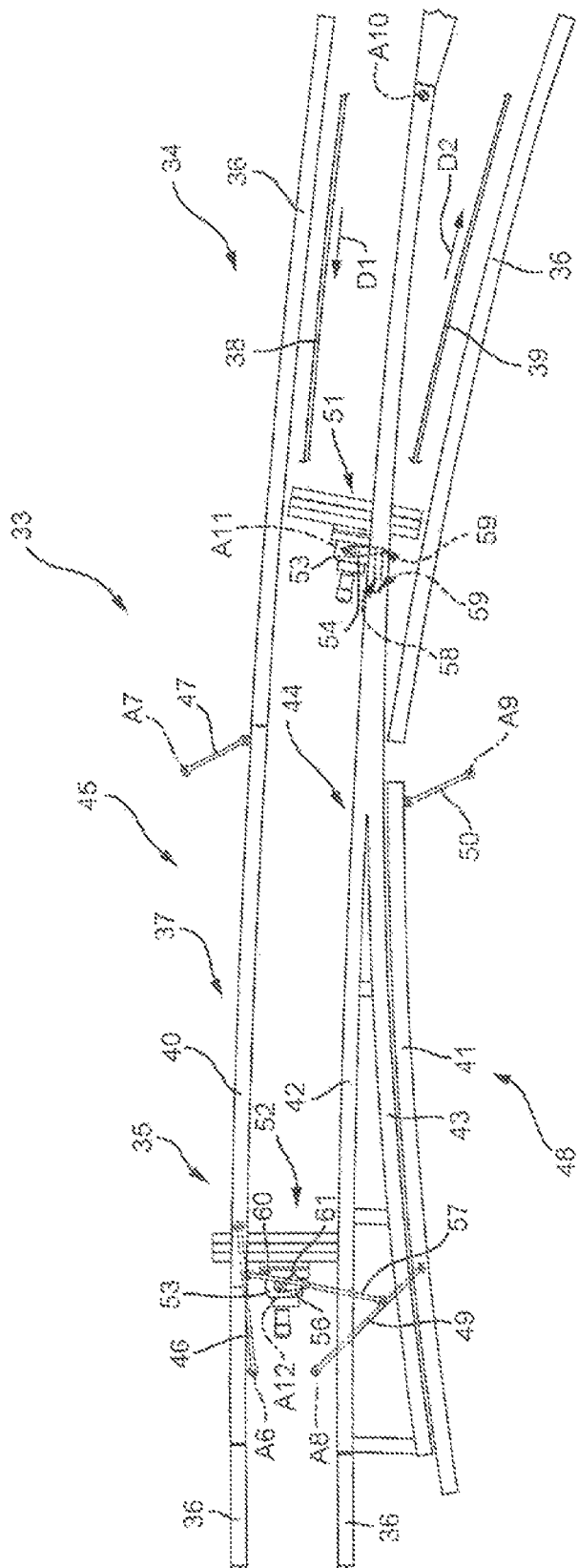
FIGS. 5 and 6 show schematic plan views of a cable transportation system comprising a switch in accordance with a third embodiment of the present disclosure.

Referring now to the example embodiments of the present disclosure illustrated in FIGS. 1 to 12, number 1 in FIG. 1 indicates as a whole a cable transportation system configured to move transportation units (not shown in the attached drawings) along a track 2 comprising a junction 3. Track 2 is defined by pairs of opposite parallel fixed guides 4, and by a switch 5 between fixed guides 4.

Cable transportation system 1 comprises two haul cables 6 and 7 moved in opposite directions D1 and D2; and the transportation units (not shown). In one such embodiment, the transportation units are attachable selectively to one of haul cables 6 and 7.

Switch 5 comprises one straight movable guide 8 mounted to rotate about an axis of rotation A1. Movable guide 8 is movable, along an operating plane 9 perpendicular to axis of rotation A1, between two designated or given positions (one indicated by a bold line, and the other by a dash line). In the FIG. 1 configuration, both the positions of movable guide 8 are operating positions defining track 2.

Switch 5 comprises an actuating assembly 10 configured to operate movable guide 8. Actuating assembly 10 comprises a rotary actuator 11; and a crank 12, which is rotated by rotary actuator 11 about an axis of rotation A2 perpendicular to operating plane 9, and is connected to movable guide 8 so that the two designated or given positions of movable guide 8 correspond to two stable positions of crank 12. The two stable positions of crank 12 correspond to respective positions of crank 12 beyond the top and bottom dead centre positions of the system defined by the mechanism comprising crank 12 and movable guide 8.

More specifically, crank 12 engages and is slideable along movable guide 8, such as by a pin on crank 12 engaging a slot 13 in movable guide 8. The slot has two opposite ends 14, one of which limits rotation of crank 12 in both rotation directions, and so defines two limit stops.

Crank 12 and movable guide 8 define a mechanism having one degree of freedom and controlled by rotary actuator 11. The limit stops of crank 12 are configured to correspond to two positions of crank 12 slightly beyond the top and bottom dead centre positions respectively of crank 12, so that any external forces acting on movable guide 8 along operating plane 9 have no effect on the position of movable guide 8 and crank 12.

In the FIG. 2 variation, the mechanism comprises crank 12, movable guide 8, and a connecting rod 15 hinged to crank 12 and movable guide 8. Operation of the mechanism is the same as in FIG. 1, except that the limit stops of crank 12 are defined by a fixed catch 14b, and by two seats 14C formed on crank 12.

Number 16 in the FIGS. 3 and 4 embodiment indicates a cable transportation system, which extends along a track 17 comprising a junction 18 and defined by pairs of fixed guides 19, and by a switch 20 between fixed guides 19.

Cable transportation system 16 comprises two haul cables 21 and 22 moved in opposite directions D1 and D2; and the transportation units (not shown). In one such embodiment, the transportation units are attachable selectively to one of haul cables 21 and 22.

At switch 20, fixed guides 19 are predominantly curved; and switch 20 comprises two curved movable guides 23 and 24 mounted to rotate about respective parallel axes of rotation A3 and A4. Movable guides 23 and 24 are each movable between two designated or given positions along an operating plane 25 coincident with the drawing plane and perpendicular to axes of rotation A3 and A4.

Switch 20 comprises one actuating assembly 26 configured to operate both movable guides 23 and 24. Actuating assembly 26 comprises a rotary actuator 27; and a crank 28, which is rotated by rotary actuator 27 about an axis of rotation A5 perpendicular to operating plane 25, and is connected to movable guides 23 and 24 by respective connecting rods 29 and 30, so that the two designated or given positions of movable guides 23 and 24 correspond to two stable positions of crank 28. Actuating assembly 26 also comprises two limit stops engaged alternatively by crank 28. In one embodiment, the crank limit stops are the same as described and illustrated with reference to FIG. 2. The two stable positions of crank 28 correspond to respective positions of crank 28 beyond the top and bottom dead centre positions of the system defined by the mechanism comprising crank 28, movable guide 23 and connecting rod 29, and by the mechanism comprising crank 28, movable guide 24 and connecting rod 30.

Figure 6:
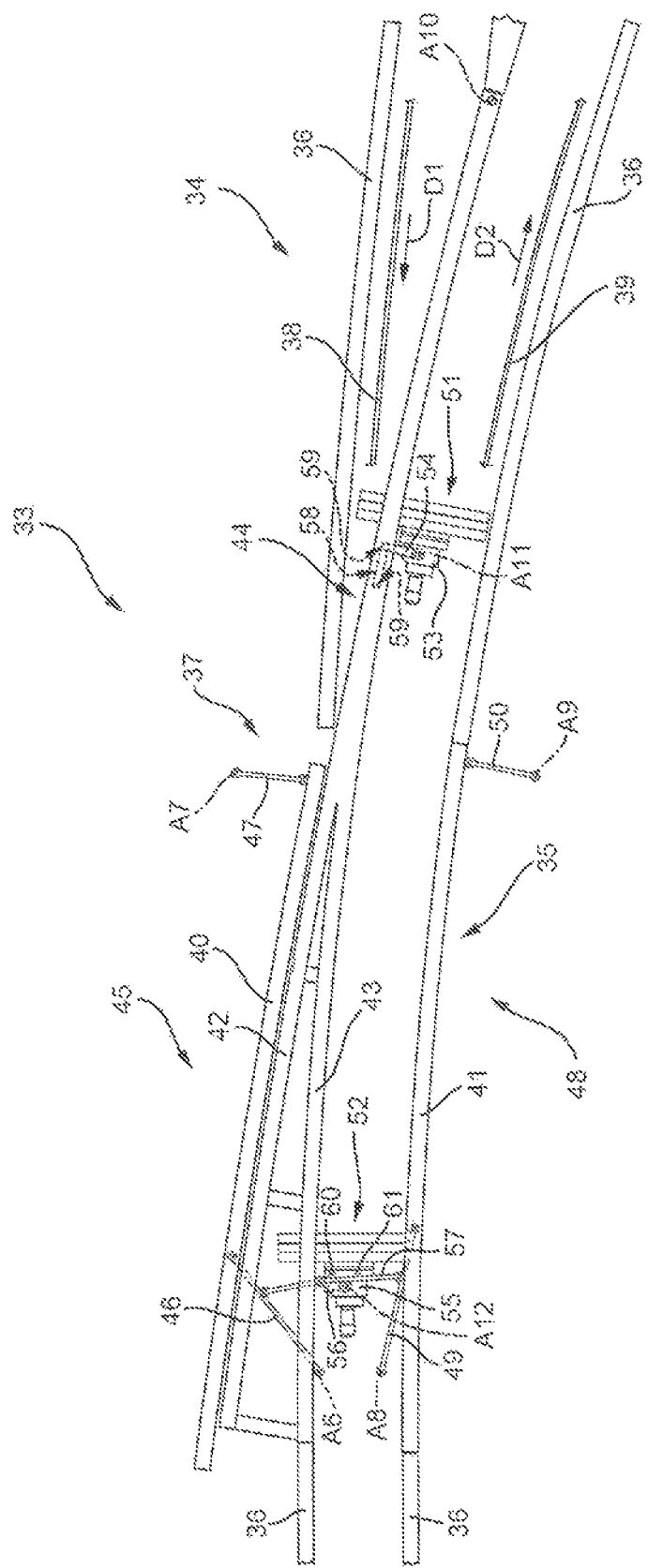

Number 33 in the FIGS. 5 and 6 embodiment indicates a cable transportation system, which extends along a track 34 comprising a junction 35 and defined by pairs of opposite fixed guides 36, and by a switch 37 between fixed guides 36.

Cable transportation system 33 comprises two haul cables 38 and 39 moved in opposite directions D1 and D2; and the transportation units (not shown). In one such embodiment, the transportation units are attachable selectively to one of haul cables 38 and 39.

At switch 37, fixed guides 36 are predominantly curved; and switch 37 comprises four curved movable guides 40, 41, 42 and 43, each mounted to move along an operating plane 44 between two designated or given positions.

More specifically, movable guide 40 forms part of an articulated quadrilateral 45, in particular an articulated antiparallelogram, comprising two fixed axes A6, A7, about which are mounted to rotate two connecting rods 46, 47 hinged to movable guide 40. Likewise, movable guide 41 forms part of an articulated quadrilateral 48, in particular an articulated antiparallelogram, comprising two fixed axes A8, A9, about which are mounted to rotate two connecting rods 49, 50 hinged to movable guide 41.

Movable guides 42 and 43 are located between movable guides 40 and 41, are connected rigidly to each other, are hinged about an axis of rotation A10, and are movable along operating plane 44.

Switch 37 comprises an actuating assembly 51 configured to operate movable guides 42 and 43; and an actuating assembly 52 configured to operate movable guides 40 and 41. Actuating assembly 51 comprises a rotary actuator 53; and a crank 54, which is rotated by rotary actuator 53 about an axis of rotation A11 perpendicular to operating plane 44, and is connected slideably to movable guides 42, 43.

Actuating assembly 52 comprises a rotary actuator 55; and a crank 56, which is rotated by rotary actuator 55 about an axis of rotation A12 perpendicular to operating plane 44, and is hinged to a connecting rod 57, the ends of which are hinged respectively to connecting rods 46 and 49 hinged to movable guides 40 and 41.

The two stable positions of crank 54 correspond to respective positions of crank 54 beyond the top and bottom dead centre positions of the system defined by the mechanism comprising crank 54 and movable guides 42 and 43. In one embodiment, crank 54 engages movable guides 42 and 43 slideably, and has a pin which slideably engages a slot 58 having two ends 59, one of which defines a limit stop for crank 54 in both rotation directions of crank 54.

Actuating assembly 52 provides for crank 56 alternatively engaging the limit stops. The two stable positions of crank 56 correspond to respective positions of crank 56 beyond the top and bottom dead centre positions of the system defined by the mechanism comprising crank 56, movable guides 40 and 41, and connecting rods 46, 49 and 57.

Actuating assembly 52 comprises two limit stops for limiting rotation of crank 56 in opposite directions, and which are formed as described and illustrated with reference to FIG. 2.

The FIGS. 7 and 8 variation shows a switch 61, which differs from switch 37 in the way the switch is operated. Connecting rod 57 is eliminated; actuating assembly 52 is connected to movable guide 40 by a connecting rod 62; actuating assembly 51 is connected to movable guide 41 by a connecting rod 63; and movable guide 40 is hinged to movable guides 42 and 43 by a connecting rod 64.

Figures 11, 12:
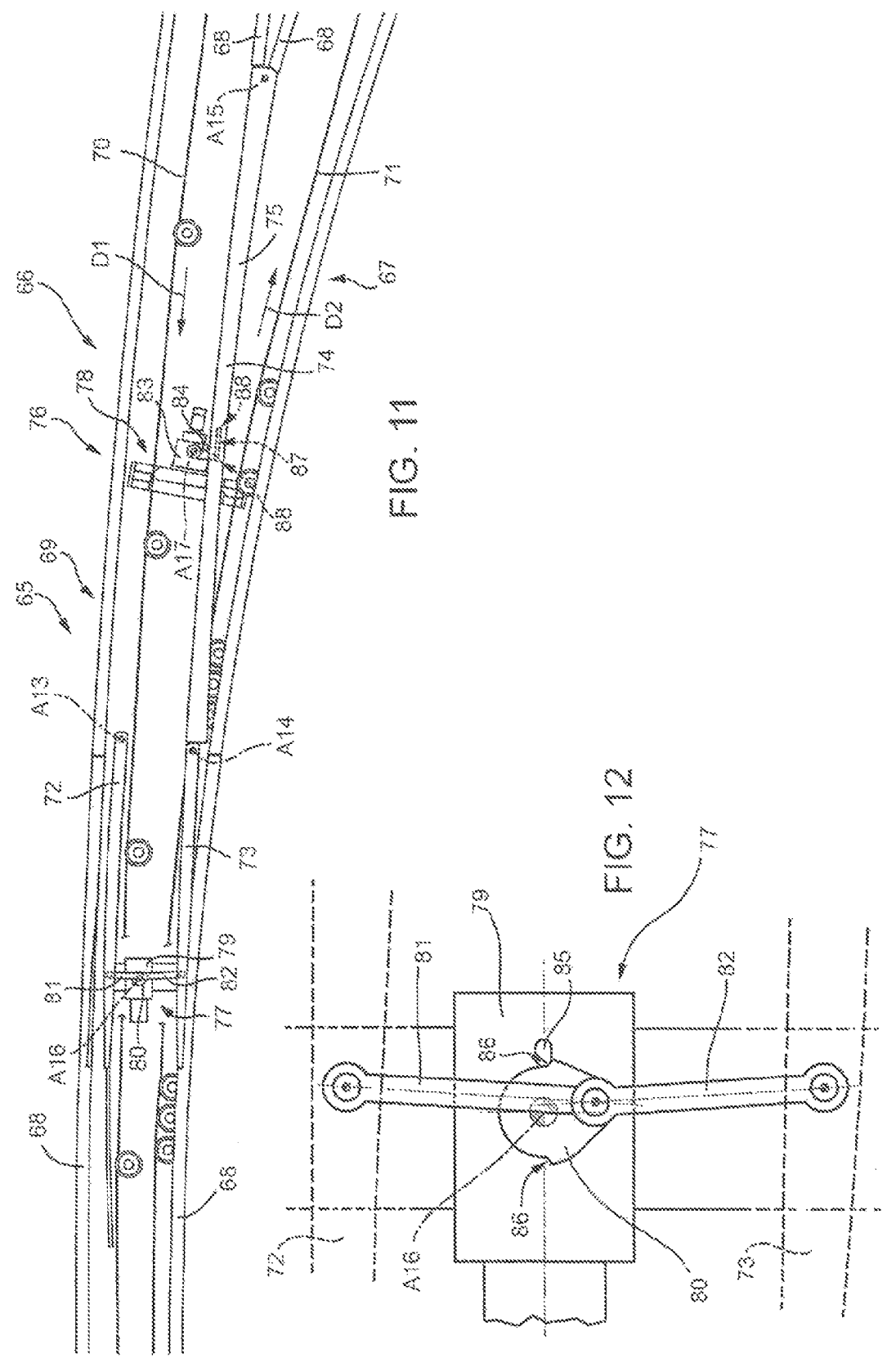

Number 65 in the FIGS. 9 and 11 embodiment indicates a cable transportation system, which extends along a track 66 comprising a junction 67 and defined by pairs of opposite parallel fixed guides 68, and by a switch 69 between fixed guides 68.

Cable transportation system 65 comprises two haul cables 70 and 71 moved in opposite directions D1 and D2; and the transportation units (not shown). In one such embodiment, the transportation units are attachable selectively to one of haul cables 70 and 71.

At switch 69, fixed guides 68 are predominantly curved; and switch 69 comprises four curved movable guides 72, 73, 74 and 75, each mounted to move between two designated or given positions along an operating plane 76 (parallel to the drawing plane).

More specifically, movable guide 72 is hinged about an axis A13; movable guide 73 substantially faces movable guide 72 and is hinged about an axis A14; and movable guides 74 and 75 are connected rigidly to each other and hinged about an axis A15.

Movable guides 72, 73, 74 and 75 are all movable along the same plane 76 to define an operating position in which movable guides 72 and 74 define a continuation of each other (FIG. 9), and a further operating position in which movable guides 73 and 75 define a continuation of each other (FIG. 11).

Switch 69 comprises an actuating assembly 77 configured to operate movable guides 72 and 73; and an actuating assembly 78 configured to operate movable guides 74 and 75.

As shown more clearly in FIGS. 10 and 12, actuating assembly 77 comprises a rotary actuator 79; and a crank 80, which is rotated by rotary actuator 79 about an axis of rotation A16 perpendicular to operating plane 76, and is hinged to two connecting rods 81 and 82, the ends of which are hinged respectively to movable guides 72 and 73.

With reference to FIGS. 9 and 11, actuating assembly 78 comprises a rotary actuator 83; and a crank 84, which is rotated by rotary actuator 83 about an axis of rotation A17 perpendicular to operating plane 76, and slideably engages movable guides 74 and 75.

With reference to FIGS. 10 and 12, in actuating assembly 77, the limit stops of crank 80 are defined by a fixed catch 85, and by two seats 86, which alternatively engage fixed catch 85 to limit rotation of crank 80 in opposite directions. The two stable positions of crank 80 correspond to respective positions of crank 80 beyond the top and bottom dead centre positions of the system defined by the mechanism comprising crank 80, movable guides 72 and 73, and connecting rods 81 and 82.

With reference to FIGS. 9 and 11, movable guides 74 and 75 have a slot 87 engaged slideably by crank 84 and bounded by two opposite ends 88, one of which defines the limit stops of crank 84 in both rotation directions. The two stable positions of crank 84 correspond to respective positions of crank 84 beyond the top and bottom dead centre positions of the system defined by the mechanism comprising crank 84 and movable guides 74 and 75.

The present disclosure makes it possible to form different types of mechanisms, and to operate a quantity or number of movable guides using one actuating assembly capable of assuming two stable positions.

Clearly, changes may be made to the switch described without, however, departing from the scope of the accompanying Claims. That is, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A cable transportation system switch comprising:
a movable guide movable, along an operating plane, from a first designated position to a second designated position and from the second designated position to the first designated position; and
an actuating assembly including:
a rotary actuator, and
a crank configured to be rotated by the rotary actuator about an axis of rotation transverse to the operating plane, said crank configured to be rotated from a first limit stop position to a second limit stop position and from the second limit stop position to the first limit stop position, and said crank being connected to the movable guide to define a mechanism having: (i) a first stable position corresponding to the first designated position of the movable guide when the crank is in the first limit stop position beyond a top dead centre position of the mechanism, and (ii) a second stable position corresponding to the second designated position of the movable guide when the crank is in the second limit stop position beyond a bottom dead centre position of the mechanism.

2. The cable transportation system switch of claim 1, which includes two first movable guides, each first movable guide movable between two designated positions along the operating plane.

3. The cable transportation system switch of claim 2, wherein the crank is connected to both the first movable guides.

4. The cable transportation system switch of claim 2, which includes:
   another actuating assembly, and
   two second movable guides connected rigidly to each other and which rotate, about an axis of rotation, along the operating plane between two designated positions.

5. The cable transportation system switch of claim 4, wherein the two first movable guides and the two second movable guides are configured such that each movable guide defines a continuation of one of the two second movable guides.

6. The cable transportation system switch of claim 5, wherein the first movable guides are hinged about respective axes of rotation.

7. The cable transportation system switch of claim 4, wherein the two second movable guides are located partly between the two first movable guides.

8. The cable transportation system switch of claim 7, wherein each first movable guide forms part of an articulated quadrilateral including two rods which rotate about respective axes of rotation.

9. The cable transportation system switch of claim 8, wherein the articulated quadrilateral includes an articulated antiparallelogram.

10. A cable transportation system switch comprising:
    a rotary actuator;
    a crank configured to be rotated by the rotary actuator about an axis of rotation transverse to an operating plane of a movable guide, said crank connected to the movable guide by a pin housed slidably inside a slot in the movable guide, and said crank configured to be moved to each of a first stable position defined by a first end of the slot in the movable guide and a second stable position defined by a second end of the slot in the movable guide; and
    a connecting rod hinged to the crank and the movable guide, wherein: (i) when the crank moves to the first stable position, the connecting rod pivots to cause the movable guide to move to a first designated position, and (ii) when the crank moves to the second stable position, the connecting rod pivots to cause the movable guide to move to a second designated position.

11. A cable transportation system switch comprising:
    a movable guide movable, along an operating plane, from a first designated position to a second designated position and from the second designated position to the first designated position; and
    an actuating assembly including:
       a rotary actuator, and
       a crank connected to the movable guide by a pin housed slidably inside a slot in the movable guide, said crank configured to be rotated by the rotary actuator about an axis of rotation transverse to the operating plane, said crank configured to be rotated from a first limit stop position defined by a first end of the slot in the movable guide to a second limit stop position defined by a second end of the slot in the movable guide and from the second limit stop position to the first limit stop position, and said crank being connected to the movable guide to define a mechanism having: (i) a first stable position corresponding to the first designated position of the movable guide when the crank is in the first limit stop position, and (ii) a second stable position corresponding to the second designated position of the movable guide when the crank is in the second limit stop position.

12. The cable transportation system switch of claim 11, which includes two first movable guides, each first movable guide movable between two designated positions along the operating plane.

13. The cable transportation system switch of claim 12, wherein the crank is connected to both the first movable guides.

14. The cable transportation system switch of claim 12, which includes:
    another actuating assembly, and
    two second movable guides connected rigidly to each other and which rotate, about an axis of rotation, along the operating plane between two designated positions.

15. The cable transportation system switch of claim 14, wherein the two first movable guides and the two second movable guides are configured such that each movable guide defines a continuation of one of the two second movable guides.

16. The cable transportation system switch of claim 15, wherein the first movable guides are hinged about respective axes of rotation.

17. The cable transportation system switch of claim 14, wherein the two second movable guides are located partly between the two first movable guides.

18. A cable transportation system switch comprising:
    a movable guide movable, along an operating plane, from a first designated position to a second designated position and from the second designated position to the first designated position; and
    an actuating assembly including:
       a rotary actuator,
       a crank configured to be rotated by the rotary actuator about an axis of rotation transverse to the operating plane, said crank configured to be rotated from a first limit stop position to a second limit stop position and from the second limit stop position to the first limit stop position, the limit stop positions being defined by a fixed catch, and two seats defined by the crank which alternatively engage the fixed catch, and said crank being connected to the movable guide to define a mechanism having: (i) a first stable position corresponding to the first designated position of the movable guide when the crank is in the first limit stop position, and (ii) a second stable position corresponding to the second designated position of the movable guide when the crank is in the second limit stop position, and
       a connecting rod hinged to the crank, and the movable guide.

19. The cable transportation system switch of claim 18, which includes two first movable guides, each first movable guide movable between two designated positions along the operating plane.

20. The cable transportation system switch of claim 19, wherein the crank is connected to both the first movable guides.

21. The cable transportation system switch of claim 19, which includes:
    another actuating assembly, and
    two second movable guides connected rigidly to each other and which rotate, about an axis of rotation, along the operating plane between two designated positions.

22. The cable transportation system switch of claim 21, wherein the two first movable guides and the two second movable guides are configured such that each movable guide defines a continuation of one of the two second movable guides.

23. The cable transportation system switch of claim 22, wherein the first movable guides are hinged about respective axes of rotation.

24. The cable transportation system switch of claim 21, wherein the two second movable guides are located partly between the two first movable guides.

25. A cable transportation system switch comprising:
a movable guide movable, along an operating plane, from a first designated position to a second designated position and from the second designated position to the first designated position;
a first actuating assembly including:
a first rotary actuator, and
a first crank configured to be rotated by the first rotary actuator about an axis of rotation transverse to the operating plane, said first crank configured to be rotated from a first limit stop position to a second limit stop position and from the second limit stop position to the first limit stop position, and said first crank being connected to the movable guide to define a first mechanism having: (i) a first stable position corresponding to the first designated position of the movable guide when the first crank is in the first limit stop position, and (ii) a second stable position corresponding to the second designated position of the movable guide when the first crank is in the second limit stop position;
a second actuating assembly;
two first movable guides, each first movable guide movable between two designated positions along the operating plane; and
two second movable guides connected rigidly to each other and which rotate, about an axis of rotation, along the operating plane between two designated positions.

26. The cable transportation system switch of claim 25, wherein the two first movable guides and the two second movable guides are configured such that each movable guide defines a continuation of one of the two second movable guides.

27. The cable transportation system switch of claim 26, wherein the first movable guides are hinged about respective axes of rotation.

28. The cable transportation system switch of claim 25, wherein the two second movable guides are located partly between the two first movable guides.

29. The cable transportation system switch of claim 28, wherein each first movable guide forms part of an articulated quadrilateral including two rods which rotate about respective axes of rotation.

30. The cable transportation system switch of claim 29, wherein the articulated quadrilateral includes an articulated antiparallelogram.

* * * * *